United States Patent
Ferrazza et al.

(10) Patent No.: US 9,318,966 B2
(45) Date of Patent: Apr. 19, 2016

(54) METHOD OF CONTROLLING A SWITCHING CONVERTER IN BURST MODE AND RELATED CONTROLLER FOR A SWITCHING CONVERTER

(71) Applicant: STMicroelectronics S.r.l., Agrate Brianza (IT)

(72) Inventors: Francesco Ferrazza, Milan (IT); Ambrogio Giuseppe D'Adda, Cornate D'Adda (IT); Claudio Adragna, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 165 days.

(21) Appl. No.: 14/311,116

(22) Filed: Jun. 20, 2014

(65) Prior Publication Data

US 2015/0003117 A1 Jan. 1, 2015

(30) Foreign Application Priority Data

Jun. 26, 2013 (IT) .............................. MI2013A1066

(51) Int. Cl.
*H02M 3/335* (2006.01)
*H02M 1/15* (2006.01)
*H02M 1/00* (2007.01)

(52) U.S. Cl.
CPC ............ *H02M 3/33546* (2013.01); *H02M 1/15* (2013.01); *H02M 3/335* (2013.01); *H02M 2001/0035* (2013.01); *H02M 2001/0054* (2013.01); *Y02B 70/1433* (2013.01); *Y02B 70/16* (2013.01)

(58) Field of Classification Search
CPC .................... H02M 2001/0035; H02M 3/335; H02M 3/33569; H02M 2001/0054; H02M 2001/0058
See application file for complete search history.

(56) References Cited

U.S. PATENT DOCUMENTS

| | | | |
|---|---|---|---|
| 8,054,006 B2 | 11/2011 | Pastori | |
| 9,219,418 B2 * | 12/2015 | Balakrishnan | H02M 3/335 |
| 2012/0099344 A1 | 4/2012 | Adragna | |
| 2012/0127761 A1 * | 5/2012 | Halberstadt | H02M 3/337 363/21.02 |
| 2012/0268095 A1 | 10/2012 | Wu | |

* cited by examiner

*Primary Examiner* — Harry Behm
(74) *Attorney, Agent, or Firm* — Seed IP Law Group PLLC (57) ABSTRACT

A method of controlling a switching converter and a related controller suitable for the switching converter allow to implement a burst-mode functioning without generating acoustic noise and with a relevantly reduced ripple of the regulated DC voltage or current provided in output to a supplied load. The method includes sensing the difference between the error signal and the burst-stop threshold at the beginning of a burst period. If the error signal has surpassed (either upwards or downwards) the burst-stop threshold, the method sets the switching stage in a high impedance state at a new active edge of a clock signal, keeps the switching stage in the high impedance state for an integer number of cycles of the clock signal, and re-enables the switching stage to switch the energy tank circuit up to the end of the burst period. The integer number is determined based on the difference between the error signal and the burst-stop threshold.

14 Claims, 8 Drawing Sheets

METHOD OF CONTROLLING A SWITCHING CONVERTER IN BURST MODE AND RELATED CONTROLLER FOR A SWITCHING CONVERTER

BACKGROUND

1. Technical Field

This disclosure relates to switching converters and more particularly to a method of controlling a switching converter in burst mode, a controller for implementing the method and a related switching converter.

2. Description of the Related Art

Switching converters are widely used in the field of power supply devices because of their performances in supplying high loads with a regulated voltage or current. They are characterized by a high switching frequency and, for reducing potentially large periodic losses at turn ON and OFF of the switches, numerous converters use a resonant tank circuit to reduce switching losses through zero-voltage switching or zero-current switching techniques.

Figure 1:
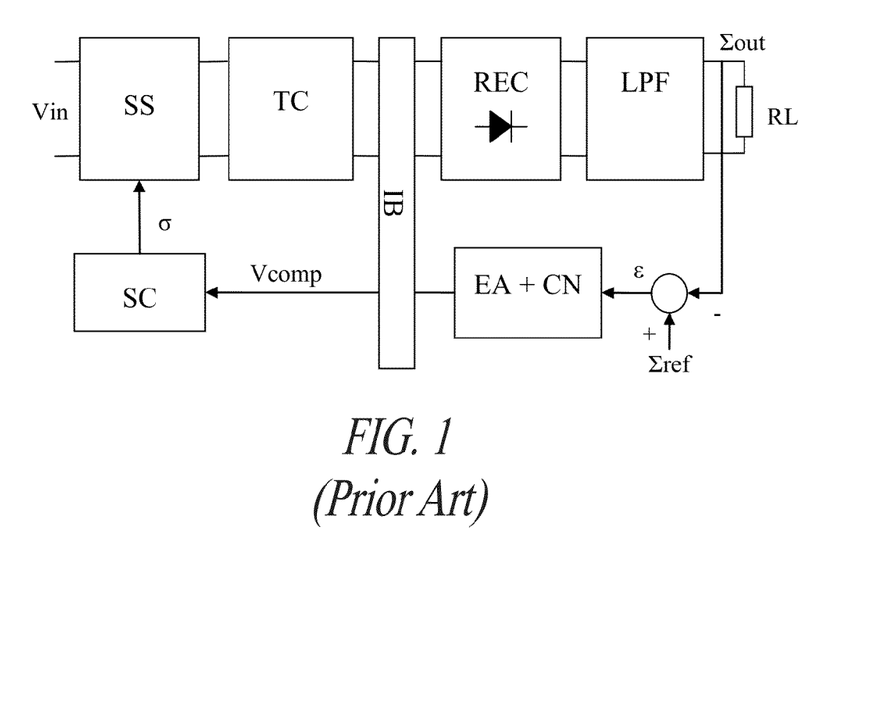
FIG. 1 is a block diagram of a prior switching converter.

A basic fed-back architecture of a switching converter is depicted in FIG. 1. It has a forward path and a feedback path, the forward path comprising:

- a switching stage SS receiving in input an unregulated voltage VIN,
- an energy tank circuit TC, that may be for example an LLC circuit, or a LCC circuit, or a LC circuit, configured to be driven by the switching stage SS,
- an optional isolation interface IB, that may be for example a transformer,
- a rectifier REC of the oscillating voltage made available by the isolation interface IB, and
- a low-pass filter LPF that generates a regulated DC output voltage or current $\Sigma$out delivered to a supplied load RL;

the feedback path comprising:

- an adder that generates a difference signal $\epsilon$ between a nominal output voltage or current $\Sigma$ref and the regulated DC output voltage or current $\Sigma$out,
- an error amplifier EA provided with a compensation network CN, that generates an error signal Vcomp representative of the difference between the regulated DC voltage or current $\Sigma$out and the respective nominal value $\Sigma$ref, and
- a switch controller SC that generates a control signal $\sigma$ the level of which is determined upon the error signal Vcomp for fixing the working frequency (frequency control), the intensity of the delivered output current (peak current mode control), or the on-times (time shift control), etc.

The control signal $\sigma$ ranges between a minimum and a maximum level, fixed for controlling the switching stage SS such to inject a minimum current in the energy tank circuit TC sufficient to ensure a Zero-Voltage Switching (ZVS), or to prevent excessive switching frequencies as well as to prevent too large variations of the functioning frequency, etc.

Figure 2:
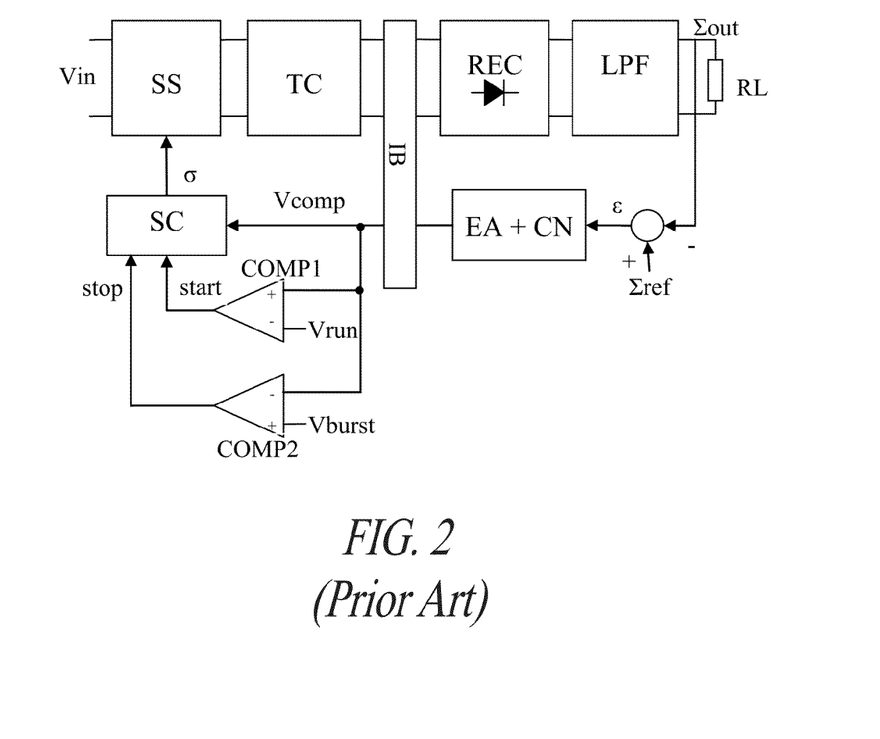
FIG. 2 is a block diagram of another prior switching converter with comparators of an error voltage with burst-stop and burst-enable thresholds.
Figure 3:
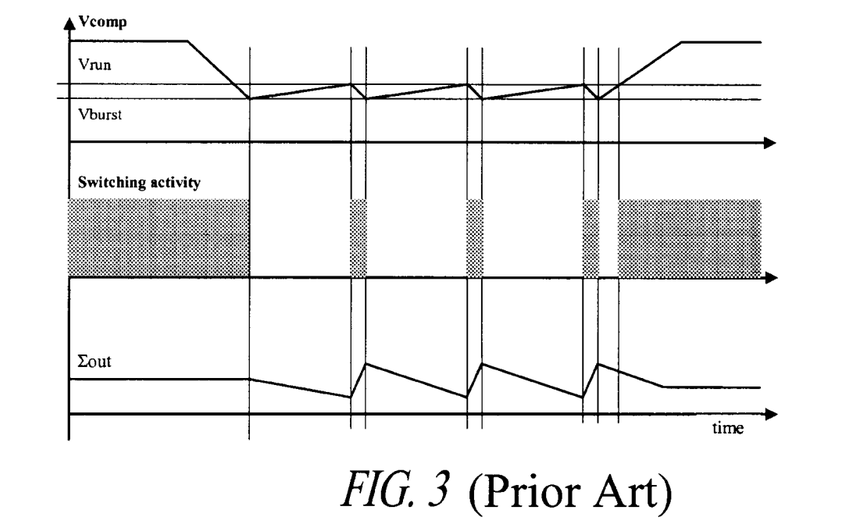
FIG. 3 is a time graph that illustrates a burst-mode functioning of the prior switching converter shown in FIG. 2.

Switching converters show good performances when heavy loads are supplied, though their efficiency worsens when light loads are supplied, unless they are not properly managed. For this reason, when the supplied load RL is light, that is when the control signal $\sigma$ has attained its minimum value and cannot be reduced further, switching converters are operated in burst mode by a feedback circuit as shown in FIG. 2. When the error signal Vcomp becomes smaller than a burst-stop threshold Vburst, that means that the supplied load RL has reduced, a first comparator COMP1 generates an active stop signal STOP that makes the switch controller SC disable the switching of the switching stage SS; when the error signal Vcomp becomes greater than a burst-enable threshold Vrun, that means that the output voltage or current $\Sigma$out has decreased, a second comparator COMP2 generates an active enable signal START that makes the switch controller SC enable the switching of the switching stage SS. FIG. 3 depicts a time graph of the signals of the switching converter of FIG. 2 that illustrates a burst mode functioning.

The graph of FIG. 3 shows that, when in burst mode, the switching stage SS is enabled for certain time intervals, represented in FIG. 3 in gray, that occur periodically at a burst frequency Fburst. The so-called "duty ratio", that is the ratio between the duration of enabling intervals during which the switching stage is enabled and the burst period 1/Fburst with which these enabling intervals occur, corresponds to the fraction of the minimum power, that may be output by the converter, absorbed by the supplied load.

Typically, the enabling intervals have a fixed duration, as shown in FIG. 3.

This functioning mode causes a ripple of the output voltage or current $\Sigma$out that may be reduced using an extremely selective (and thus expensive) low-pass filter LPF. In any case, the output ripple in this functioning condition is increased in respect to a functioning condition in which the converter supplies a load heavier than a minimum value corresponding to the burst-stop threshold Vburst. Moreover, very often the burst frequency Fburst is comprised in the range of acoustic frequencies, and thus may cause audible noise.

BRIEF SUMMARY

The applicants have found a method of controlling a switching converter and a related controller suitable for a switching converter that allow to implement a burst-mode functioning without generating acoustic noise and with a relevantly reduced ripple of the regulated DC voltage or current provided in output to a supplied load.

In the method of this disclosure, this excellent result is obtained by sensing the difference between the error signal and the burst-stop threshold at the beginning of a burst period and, if the error signal has surpassed (either upwards or downwards) the burst-stop threshold, by setting the switching stage in a high impedance state at the occurrence of a new active edge of a clock signal, i.e., at the beginning of a first switching cycle to be skipped, keeping the switching stage in the high impedance state for an integer number of cycles of the clock signal, the integer number being determined upon the difference between the error signal and the burst-stop threshold, and re-enabling the switching stage to switch the energy tank circuit up to the end of the burst period.

According to an embodiment, these operations are performed by: counting from zero cycles of the clock signal from the beginning of a burst period after the error signal has surpassed the burst-stop threshold; comparing the counting with the integer number; when a counter has counted the integer number of clock pulses, re-enabling the switching stage to switch the energy tank circuit for a number of cycles given by the difference between a fixed number of cycles, corresponding to a fixed burst period, and the integer number of skipped switching cycles and resetting the counting.

According to another embodiment, the integer number is proportional to the difference between the error signal and the burst-stop threshold.

A controller for implementing the above method and a related switching converter are also disclosed.

The claims as filed are integral part of this specification and are herein incorporated by reference.

DETAILED DESCRIPTION

Figure 4:
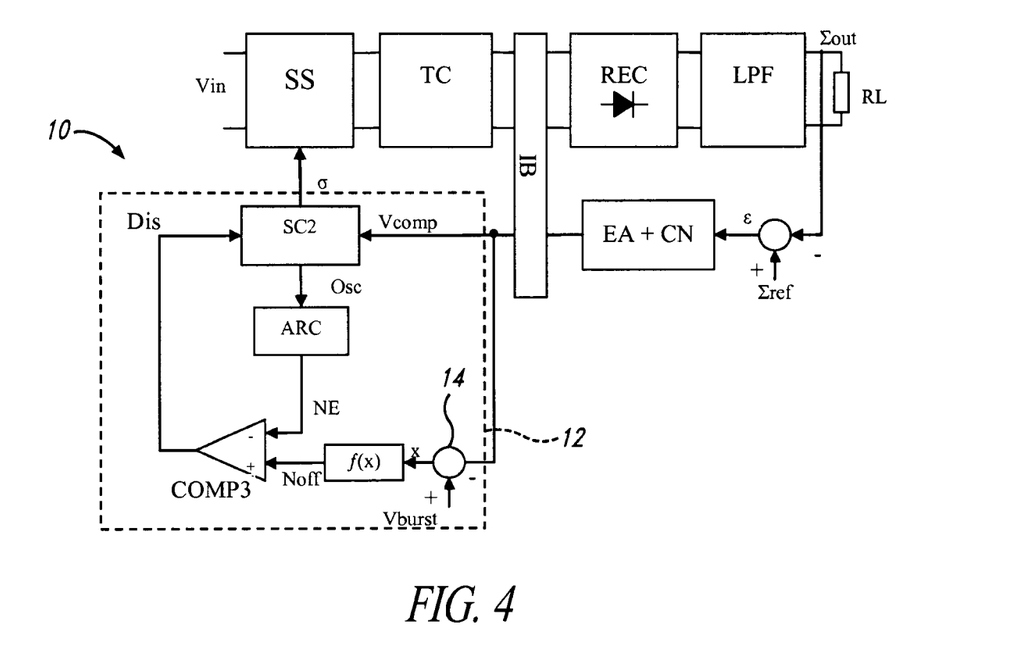
FIG. 4 is a block diagram of a switching converter according to an embodiment of this disclosure.

A high-level scheme of an embodiment of a switching converter 10 according to this disclosure is depicted in FIG. 4, in which the same blocks and signals have the same name. The controller 12 of the converter 10, within the dashed perimeter, includes an adder 14 that generates the difference x between the burst-stop threshold Vburst and the error signal Vcomp, a block f(x) receiving in input the difference x and generating a signal Noff representing an integer number corresponding to the difference x, a counter ARC counting cycles of a clock signal Osc that determines the switching cycles of the switching stage when in operation, and a comparator COMP3 generating a logic flag for enabling a switch controller SC2 that generates, when enabled, the control signal σ for the switching stage SS. The switch controller SC2 of FIG. 4 differs from the switch controller SC of FIGS. 1 and 2 because it is configured to set the switching stage SS in a high impedance state when an active edge of the flag Dis is generated by the comparator COMP3, and because it may provide in input to the counter ARC a clock signal Osc the active edges of which synchronize the beginning of switching cycles of the switching stage SS.

The just described circuitry of the controller 12 of the switching converter 10 does not compare the error signal Vcomp with a burst-stop threshold Vburst and a burst-enable threshold Vrun, but disables/enables the switching stage by:

a) determining the difference x between the error signal Vcomp and the burst-stop threshold Vburst, at the beginning of a burst period;

if the signal Vcomp has surpassed the threshold Vburst:

b) establishing an integer number of switching cycles of switching stage SS to be skipped, that corresponds to establish an integer number of cycles of the clock signal Osc;

c) setting the switching stage SS in a high impedance state at the beginning of a new switching cycle and keeping it in that state until the counter ARC has counted the integer number of cycles of the clock signal Osc;

d) when the counting NE of the counter ARC has attained the integer number represented by the signal Noff, resetting the counter ARC and providing a signal to the switch controller SC2 to enable the functioning of the switching stage SS up to the end of the burst period.

Preferably, the switching stage SS is kept enabled for a number of cycles equal to the difference between a fixed number of cycles and the above determined integer number, before restarting from step a) if the signal Vcomp surpasses again the threshold Vburst. This amounts to fixing the burst period of the switching activity, i.e., to fixing the burst frequency Fburst. Conveniently, this frequency Fburst will be fixed to reduce acoustic noise.

In the shown example, the switching stage is disabled when the signal Vcomp becomes smaller than the threshold Vburst, though the herein disclosed control technique may be implemented mutatis mutandis in the dual case in which the signal Vcomp becomes greater than the burst-stop threshold Vburst.

Preferably but not necessarily, the block f(x) generates the signal Noff with a discrete level that is substantially proportional to the difference x between the error signal Vcomp and the burst-stop threshold Vburst. According to the above illustrated embodiment in which the burst frequency Fburst is constant, the value f(x) may range from 0 up to the number of switching cycles that compose the period of the switching activity.

With the above described controller, an integer number of switching cycles, preferably proportional to the difference x, are skipped and, during the skipped switching cycles, the energy tank circuit TC "sees" the switching stage SS as a high impedance stage.

The fact that switching cycles are skipped synchronously with the active edges that synchronize the switching of the stage SS, instead of stopping the switching at a random instant as in the prior converters of FIGS. 1 and 2, strongly reduces stresses on the switching stage SS, on the energy tank circuit TC and on the output circuitry that delivers the regulated DC voltage or current. Indeed, the current in the energy tank circuit TC is zero when the switching stage SS is set in a high impedance state, and the voltage on the capacitor of the LC circuit that constitutes the energy tank circuit TC remains constant up to the instant in which the switching stage SS is enabled again. Therefore, the current in the energy tank circuit TC starts from its steady-state value when the switching stage is resumed from the high-impedance state.

With this technique, that may be easily adapted in numerous types of switching converters such as for example resonant, multi-resonant and soft-switching converters, power is supplied to the load RL in a controlled fashion, such to have a reduced ripple of the delivered DC voltage or current in light load conditions.

Figure 5:
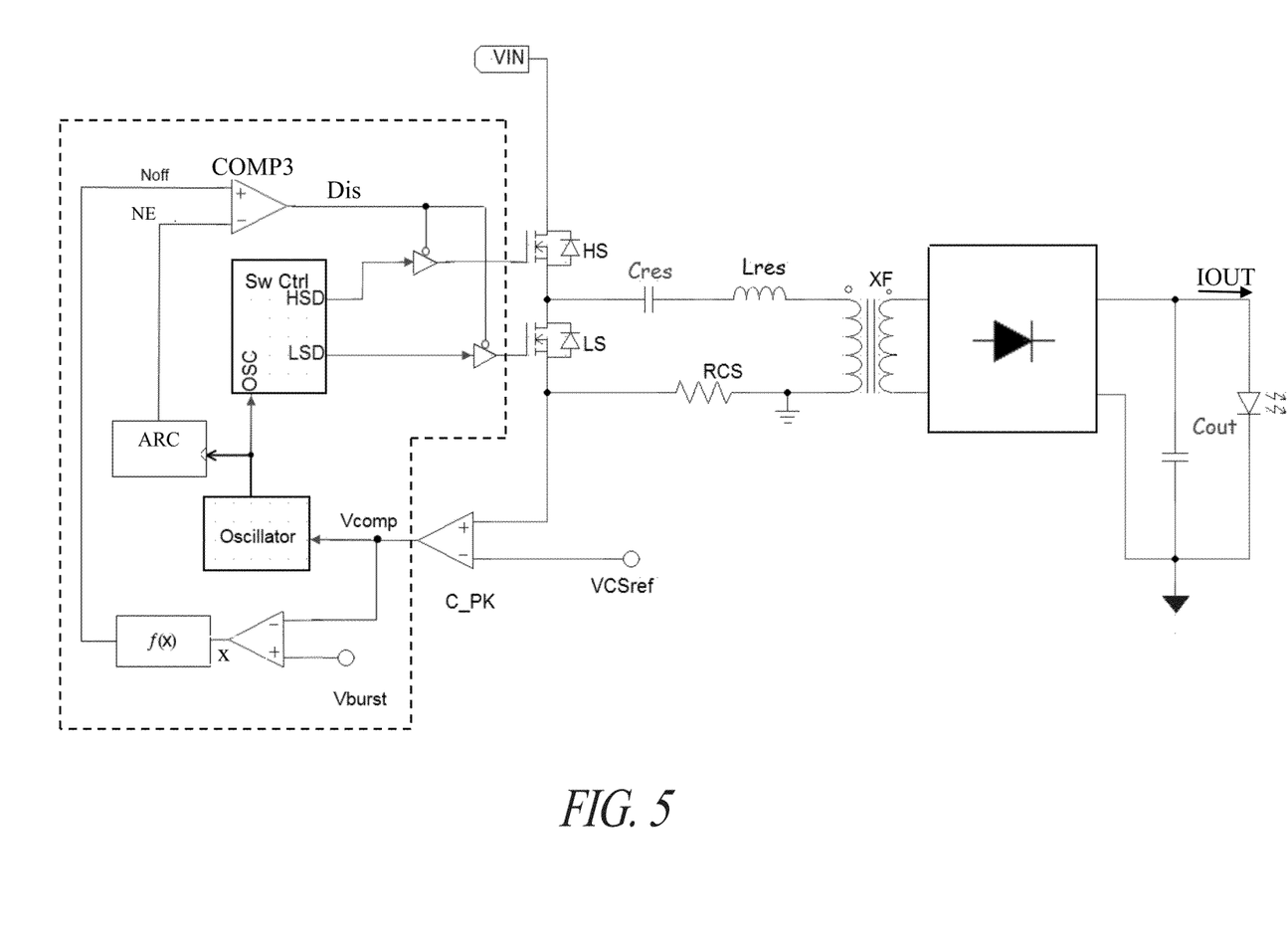
FIG. 5 is a high-level circuit scheme of a resonant switching converter according to another embodiment of this disclosure, connected to supply a LED.

An embodiment of a resonant switching converter implementing the method of this disclosure is depicted in FIG. 5. Differently from the switching converter of FIG. 4:

the output current delivered to the supplied LED is controlled at the primary side;

the reference value VCSref may be adjusted; and the switch controller SW CTRL of the depicted resonant converter receives in input the clock signal OSC generated by the oscillator OSCILLATOR and generates signals HSD and LSD for driving the high-side switch HS and the low-side switch LS of the switching stage.

The energy tank circuit is a LC resonant circuit composed of a capacitor Cres, an inductor Lres and a winding of a transformer XF that galvanically isolates the resonant circuit from the load.

Figure 6:
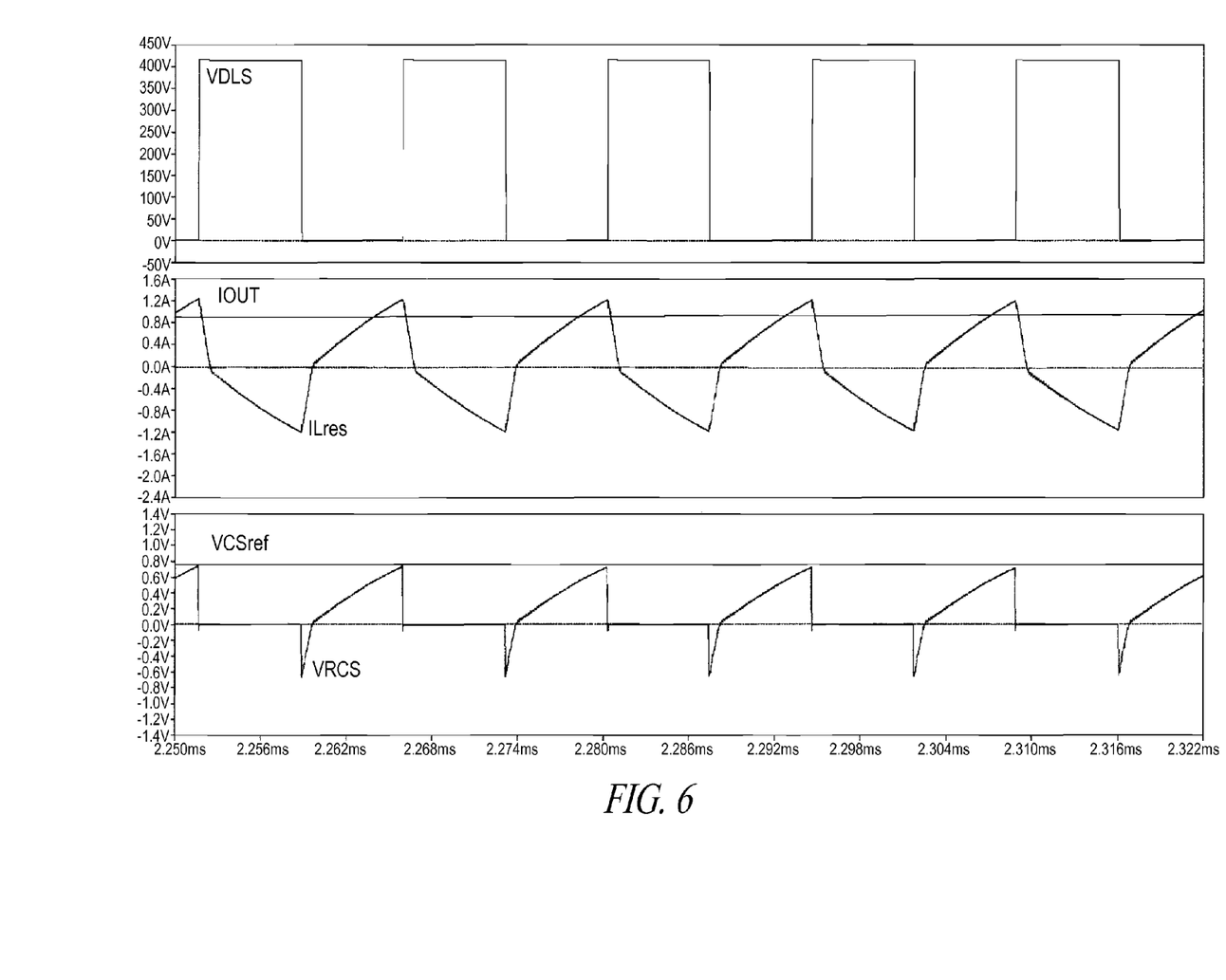
FIG. 6 is an exemplary time graph of the main signals of the resonant switching converter of FIG. 5 when the supplied load absorbs a relatively high output current.

Preferably, the values of the capacitor Cres and of the inductor Lres are chosen such to bring the converter function relatively far from the resonance frequency of the tank circuit, in order to make substantially triangular the current ILres flowing therethrough, as shown in the exemplary time graph of FIG. 6 for a relatively high output current IOUT delivered by the converter. This time graph shows also the drain voltage VDLS of the low side switch LS, that is the voltage on the intermediate node of the half-bridge switching stage, the output current IOUT drawn by the supplied LED, the reference voltage VCSref and the sense voltage VRCS on the sense resistor RCS.

As discussed more in detail in the U.S. Pat. No. 8,054,006 in the name of the same Applicant, the disclosure of which is herein incorporated by reference in its entirety, the peak value of the current ILres is tied to its mean value. The DC current delivered to the supplied LED is proportional to the mean value of the current ILres through the transformation ratio of the transformer XF, thus it is possible to regulate the output current IOUT by controlling the peak value of the current ILres through the switching stage. Unfortunately, the output current may be accurately regulated only if the power absorbed by the supplied load is greater than a minimum value that depends upon the oscillation frequency Fosc of the switching converter, as schematically resumed in the exemplary characteristic of minimum output power (Pout) vs. oscillation frequency (Fosc) of FIG. 7 for the resonant switching converter of FIG. 5.

Figure 8:
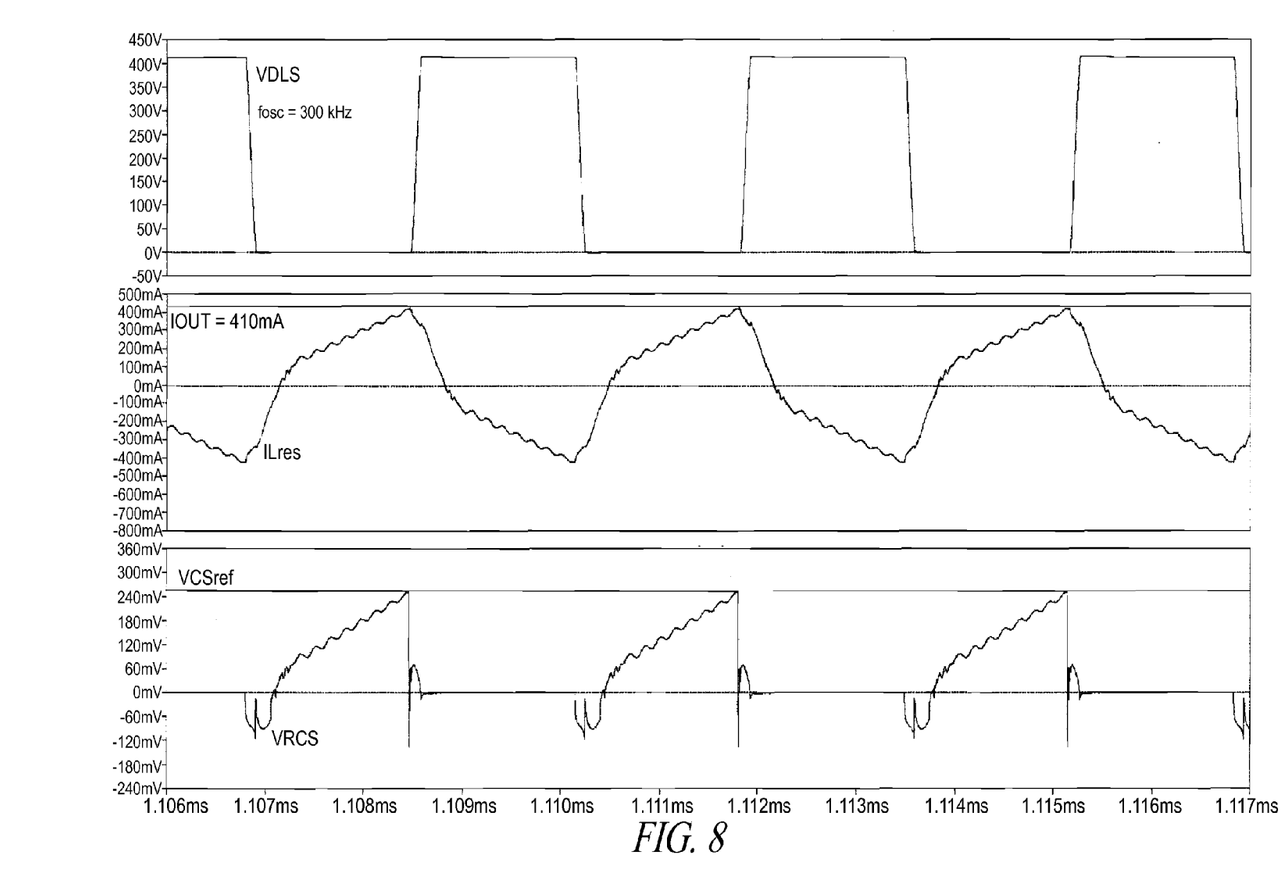
FIG. 8 is an exemplary time graph of the main signals of the resonant switching converter of FIG. 5 when the supplied load absorbs a relatively low output current and the method of this disclosure is not implemented.

As shown by the exemplary time graph of FIG. 8, when the load is absorbing the minimum output power Pout corresponding to the oscillation frequency Fosc of the resonant switching converter of FIG. 5, the current ILres presents oscillations and the voltage VRCS on the sense resistor RCS is affected by spurious undershoots.

By contrast, with the herein disclosed technique it is possible to regulate accurately the output current even below the minimum output power level fixed by the characteristic of FIG. 7.

Figure 9:
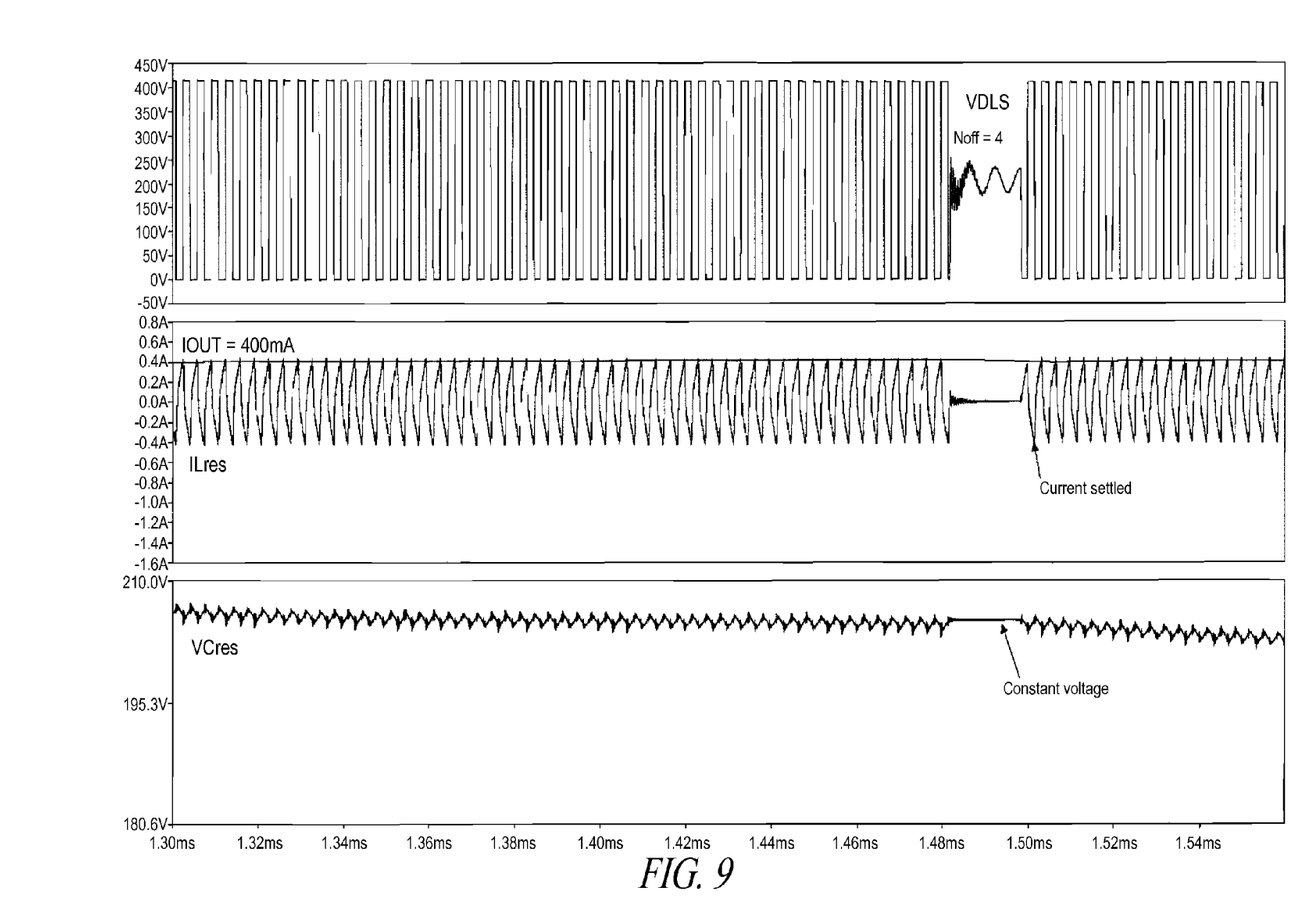
FIG. 9 is an exemplary time graph of the main signals of the resonant switching converter of FIG. 5 that implements the method of this disclosure when the supplied load absorbs a relatively low output current.

FIG. 9 is a time graph that shows the functioning of the resonant switching converter of FIG. 5 when four switching cycles (Noff=4) are skipped every 64 switching cycles (the fixed period of the burst activity, in the shown example) according to the method of this disclosure. During the skipped switching cycles, the voltage on the capacitor Cres of the LC resonant circuit remains constant at its steady-state value. Using this technique, it is possible to regulate an output current IOUT lower than that corresponding to the minimum output power to be delivered according to the characteristic shown in FIG. 7.

Figure 7:
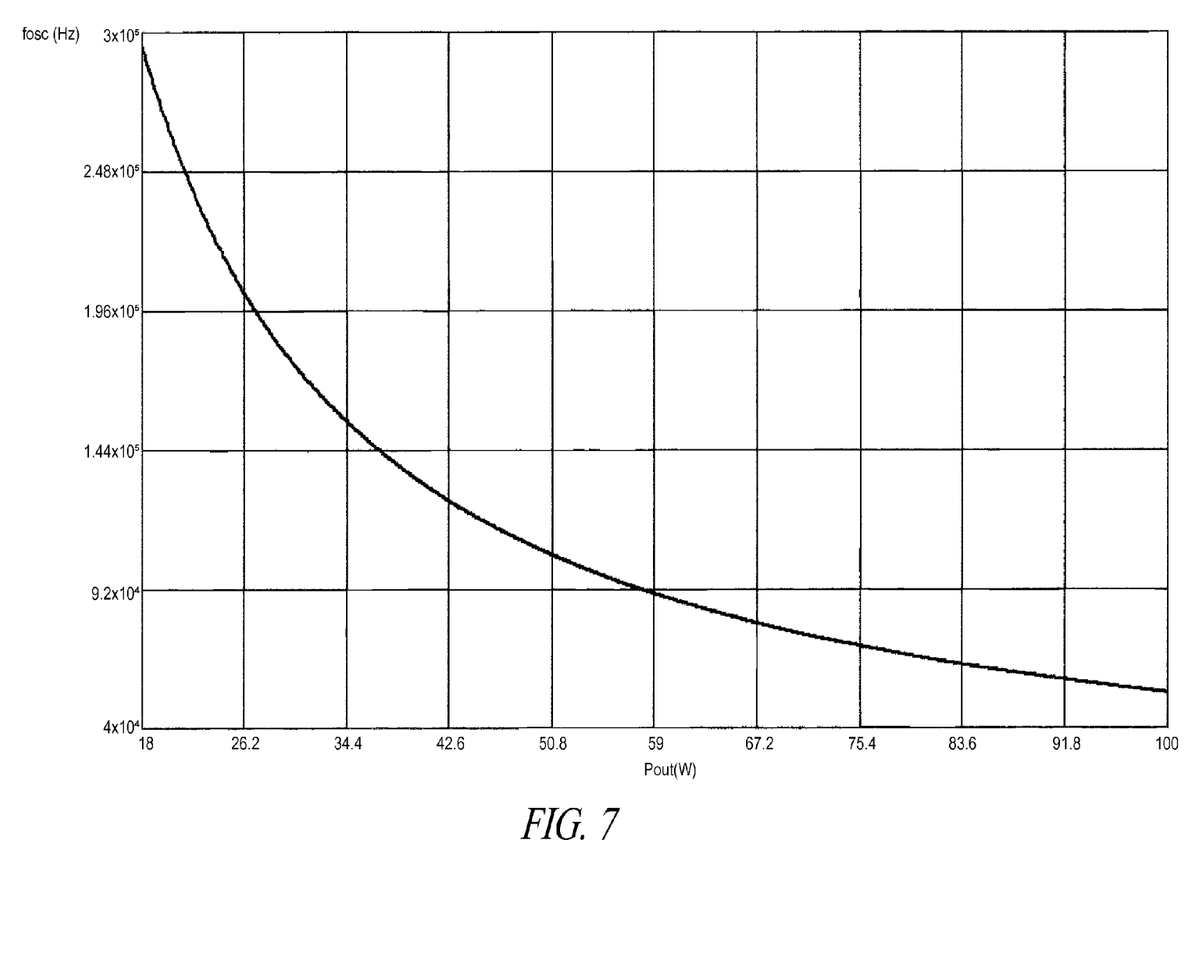
FIG. 7 is an exemplary characteristic of minimum output power vs oscillation frequency of the resonant switching converter of FIG. 5 when the method of this disclosure is not implemented.

Tests carried out by the Applicant showed that it is possible to regulate an output power smaller than 0.1% of the minimum power that should be delivered, according to the characteristic of FIG. 7, in order to implement the control strategy discussed in the prior U.S. Pat. No. 8,054,006.

Figure 10:
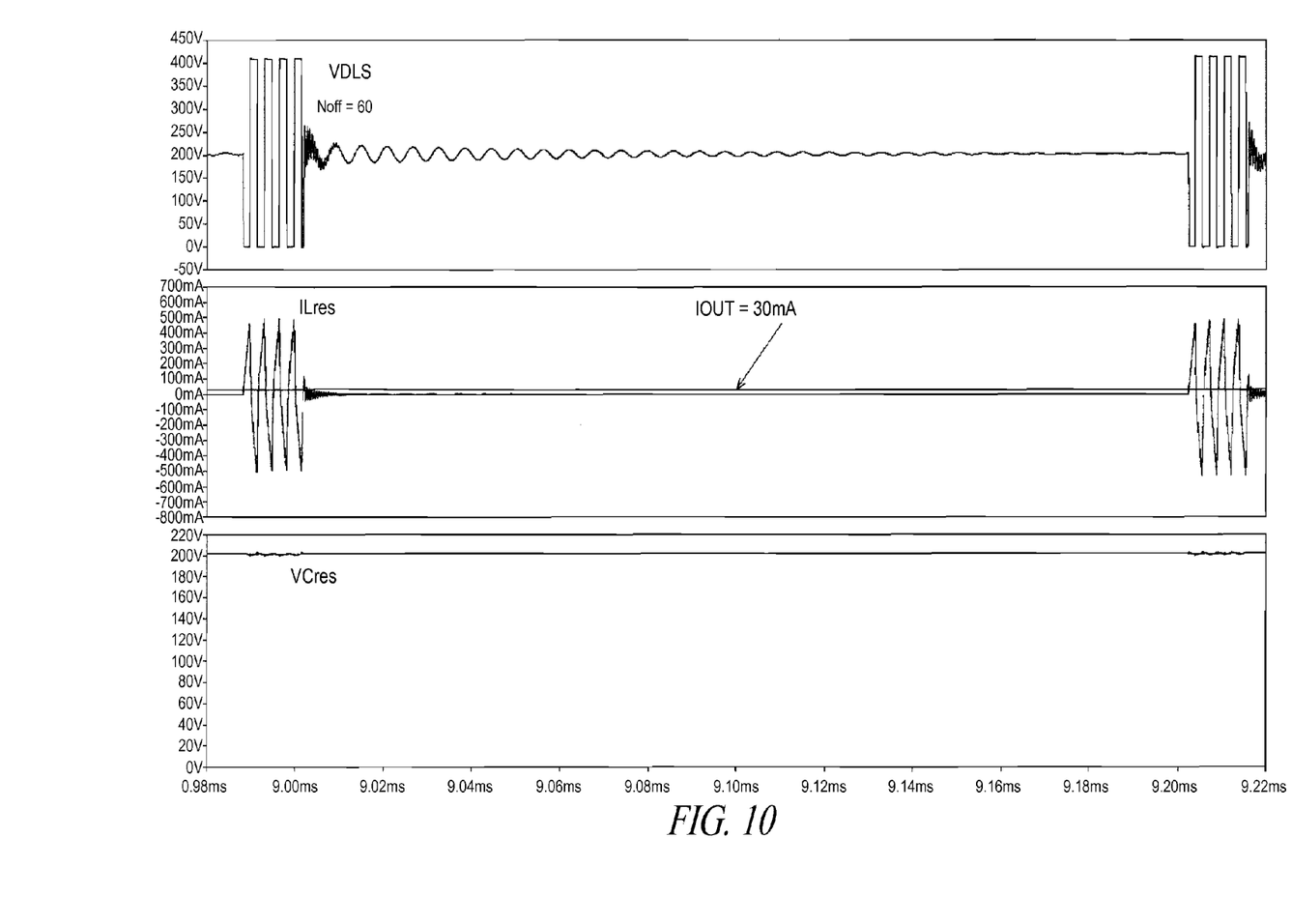
FIG. 10 is an exemplary time graph of the main signals of the resonant switching converter of FIG. 5 that implements the method of this disclosure when the supplied load absorbs a very low output current.

As shown in FIG. 10, with the switching converter of FIG. 5 implementing the method of this disclosure it has been possible to regulate in a refined manner even a very low output current of 30 mA. In this case, the switching stage is enabled for only four switching cycles every 64, then the controller of the converter of FIG. 5 skips 60 consecutive switching cycles for regulating such a low current. The fact that the switching stage is kept in a high impedance state when the controller commands to skip switching cycles, allows to keep constant the voltage VCres on the capacitor of the LC resonant circuit and thus to have a current flowing throughout the resonant tank circuit starting from its steady-state value, with a consequent reduction of the output ripple when switching is resumed.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:
controlling a switching converter configured to output in operation a regulated DC voltage or current, the switching converter including a switching stage configured to drive an energy tank circuit, said controlling including:
controlling in a burst mode the switching stage to increase the regulated DC voltage or current by performing switching cycles synchronously with active edges of a clock signal for switching the energy tank circuit between a positive voltage line and a negative voltage line, or to decrease the regulated DC voltage or current when an error signal, representative of a difference between the regulated DC voltage or current and a nominal output voltage or current, surpasses a burst-stop threshold,
sensing a difference between the error signal and the burst-stop threshold at a beginning of a burst period;
determining an integer first number based on the difference between the error signal and the burst-stop threshold at a beginning of a burst period;
if the error signal has surpassed the burst-stop threshold:
setting the switching stage in a high impedance state at a new active edge of the clock signal,
keeping the switching stage in the high impedance state for a number of cycles of said clock signal equal to the first number, and
re-enabling, up to an end of the burst period, the switching stage to switch the energy tank circuit.

2. The method of claim 1, further comprising:
counting, starting from zero, cycles of said clock signal from the beginning of the burst period after the error signal has surpassed the burst-stop threshold, the counting obtaining a count;
comparing said count with said first number, wherein the re-enabling includes re-enabling the switching stage in response to determining, during by comparing, that the count has reached the first number; and
keeping the switching stage enabled for a second number of clock cycles equal to a difference between a fixed third number of cycles and said first number, and resetting said counting in response to determining, during by comparing, that the count has reached the first number.

3. The method of claim 1, wherein said first number is proportional to the difference between said error signal and said burst-stop threshold (Vburst).

4. A controller suitable for a switching converter, the controller comprising:

an input terminal configured to receive an error signal, representative of a difference between a regulated DC voltage or current and a nominal output voltage or current;

a switching controller configured to control in a burst mode a switching stage to increase the regulated DC voltage or current by performing switching cycles synchronously with active edges of a clock signal for switching an energy tank circuit of the converter between a positive voltage line and a negative voltage line, or to decrease the regulated DC voltage or current when an error signal, representative of a difference between the regulated DC voltage or current and the nominal output voltage or current, surpasses a burst-stop threshold, means for:
sensing a difference between the error signal and the burst-stop threshold at a beginning of a burst period;
determining an integer first number based on the difference between the error signal and the burst-stop threshold at a beginning of a burst period;
if the error signal has surpassed the burst-stop threshold:
causing the switching controller to set the switching stage in a high impedance state at a new active edge of the clock signal,
causing the switching controller to keep the switching stage in the high impedance state for a number of cycles of said clock signal equal to the first number, and
causing the switching controller to re-enable the switching stage to switch the energy tank circuit until an end of the burst period.

5. The controller of claim 4, wherein the means includes:
a counter configured to be reset and to start counting cycles of said clock signal from the beginning of the burst period after the error signal has surpassed the burst-stop threshold, the counter being configured to produce a counting signal representing a count of the cycles of said clock signal from the beginning of the burst period after the error signal has surpassed the burst-stop threshold; and
a comparator configured to compare the counting signal and said first number and generate a logic flag having a value based on said comparison, the switching controller being configured to re-enable the switching stage to switch the energy tank circuit in response to the logic flag indicating that the counter has counted said integer number of cycles.

6. The controller of claim 5, wherein the means include:
an adder configured to receive said error signal and a voltage corresponding to said burst-stop threshold, and to generate a corresponding difference signal,
a circuit block configured to receive said difference signal and to generate said first number having a discrete level substantially proportional to said difference signal.

7. The controller of claim 6, wherein said first number has a discrete level that ranges from 0 up to a fixed maximum number of switching cycles.

8. A resonant switching converter configured to output in operation a regulated DC voltage or current, comprising:
an energy tank circuit;
a feedback path configured to generate in operation an error signal; and
a controller circuit configured to:
receive said error signal,
control in a burst mode a switching stage to increase the regulated DC voltage or current by performing switching cycles synchronously with active edges of a clock signal for switching the energy tank circuit of the converter between a positive voltage line and a negative voltage line, or to decrease the regulated DC voltage or current when the error signal, representative of a difference between the regulated DC voltage or current and the nominal output voltage or current, surpasses a burst-stop threshold,
sense a difference between the error signal and the burst-stop threshold at a beginning of a burst period;
determine an integer first number based on the difference between the error signal and the burst-stop threshold at a beginning of a burst period;
if the error signal has surpassed the burst-stop threshold:
set the switching stage in a high impedance state at a new active edge of the clock signal,
keep the switching stage in the high impedance state for a number of cycles of said clock signal equal to the first number, and
re-enable the switching stage to switch the energy tank circuit until an end of the burst period.

9. The resonant switching converter of claim 8, comprising:
a transformer having a primary winding, connected in series with said energy tank circuit, and a secondary winding;
a rectifier and a low-pass filter functionally connected to the secondary winding and to each other and configured to generate said regulated DC voltage or current.

10. The resonant switching converter of claim 9, further comprising a sense resistor, wherein:
said negative voltage line is at a ground potential;
said switching stage includes a low-side switch coupled to ground through the sense resistor; and
said feedback path comprises a first amplifier configured to generate said error signal as an amplified replica of a difference between a voltage on said sense resistor and a fixed voltage.

11. A controller suitable for a switching converter with an energy tank circuit the controller comprising:
an input terminal configured to receive an error signal, representative of a difference between a regulated DC voltage or current and a nominal output voltage or current;
a switching controller configured to control a switching stage of the switching converter;
a sense circuit configured to sense a difference between the error signal and a burst-stop threshold at a beginning of a burst period and determine an integer first number based on the difference between the error signal and the burst-stop threshold at a beginning of a burst period; and
a comparator configured to determine if the error signal has surpassed the burst-stop threshold and cause the switching controller to set the switching stage in a high impedance state at a new active edge of a clock signal; the switching controller being configured to keep the switching stage in the high impedance state for a number of cycles of said clock signal equal to the first number, and to re-enable the switching stage to switch the energy tank circuit until an end of the burst period.

12. The controller of claim 11, comprising:
a counter configured to be reset and to start counting cycles of said clock signal from the beginning of the burst period after the error signal has surpassed the burst-stop threshold, the counter being configured to produce a counting signal representing a count of the cycles of said clock signal from the beginning of the burst period after the error signal has surpassed the burst-stop threshold, wherein the comparator is configured to compare the counting signal and said first number and generate a logic flag having a value based on said comparison, the switching controller being configured to re-enable the switching stage to switch the energy tank circuit in response to the logic flag indicating that the counter has counted said integer number of cycles.

13. The controller of claim 11, wherein the sense circuit includes:
- an adder configured to receive said error signal and a voltage corresponding to said burst-stop threshold, and to generate a corresponding difference signal,
- a circuit block configured to receive said difference signal and to generate said first number having a discrete level substantially proportional to said difference signal.

14. The controller of claim 11, wherein said first number has a discrete level that ranges from 0 up to a fixed maximum number of switching cycles.

\* \* \* \* \*